United States Patent
Wijers

[15] 3,684,112
[45] Aug. 15, 1972

[54] CAMPER LOADING MECHANISM
[72] Inventor: Gerardus A. Wijers, Eugene, Oreg.
[73] Assignee: Sportsman Camper Equipment Co.
[22] Filed: Aug. 14, 1970
[21] Appl. No.: 63,675

[52] U.S. Cl....................................214/517, 280/508
[51] Int. Cl............................B60p 1/64, B60p 3/32
[58] Field of Search.......214/5.6, 517, 38.8; 280/508

[56] References Cited
UNITED STATES PATENTS

| | | | |
|---|---|---|---|
| 3,262,591 | 7/1966 | Aldropp | 214/517 |
| 3,221,913 | 12/1965 | Chamberlain | 214/517 |
| 755,850 | 3/1904 | Crisler | 280/508 |
| 3,229,839 | 1/1966 | Rasmussen | 214/517 |

Primary Examiner—Albert J. Makay
Attorney—James D. Givnan, Jr.

[57] ABSTRACT

A mechanism for loading and unloading camper units from a truck. A truck mounting assembly is carried by the camper and attachable to the truck only when the camper is to be installed upon the truck. The truck mounting assembly is carried by parallel roller chains attached at the ends to opposite ends of the camper. Sprocket train assemblies walk along the entrained roller chains to move the camper into and out of the truck bed. Wheels support the bottom wall of the camper during loading and unloading of the camper.

5 Claims, 8 Drawing Figures

3,684,112

INVENTOR
GERARDUS A. WIJERS
BY
AGENT

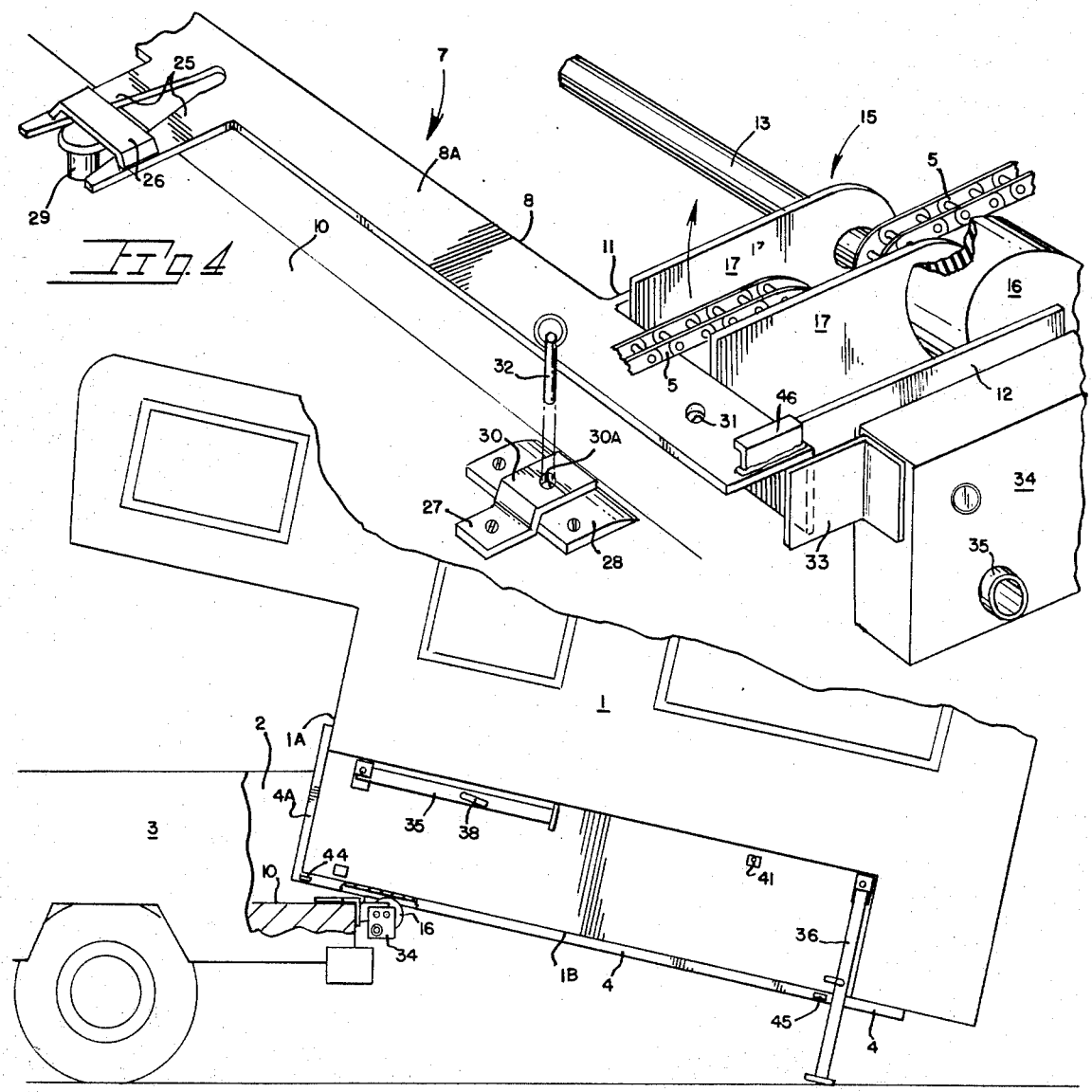

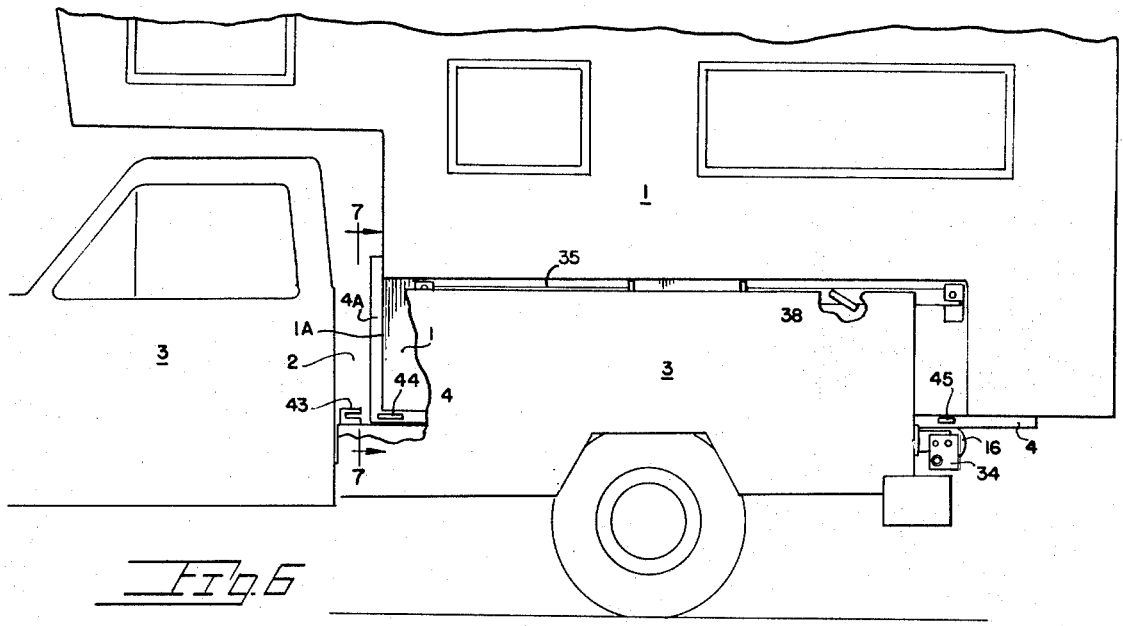
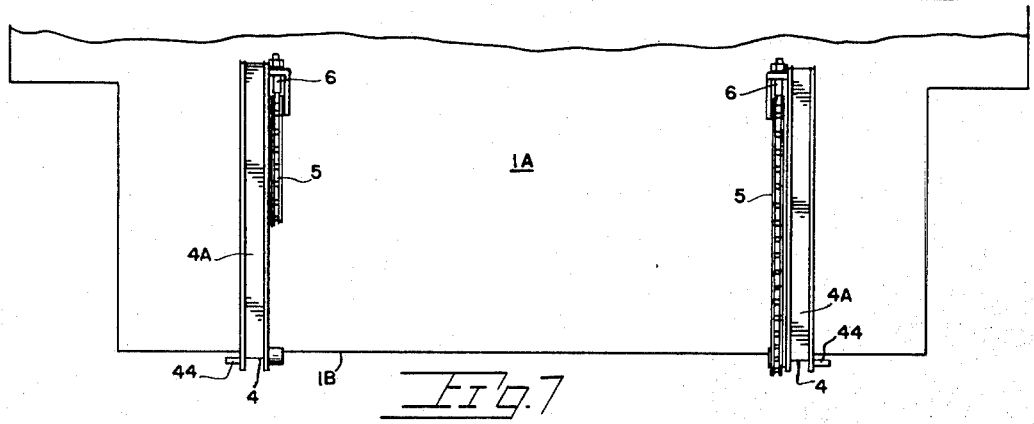
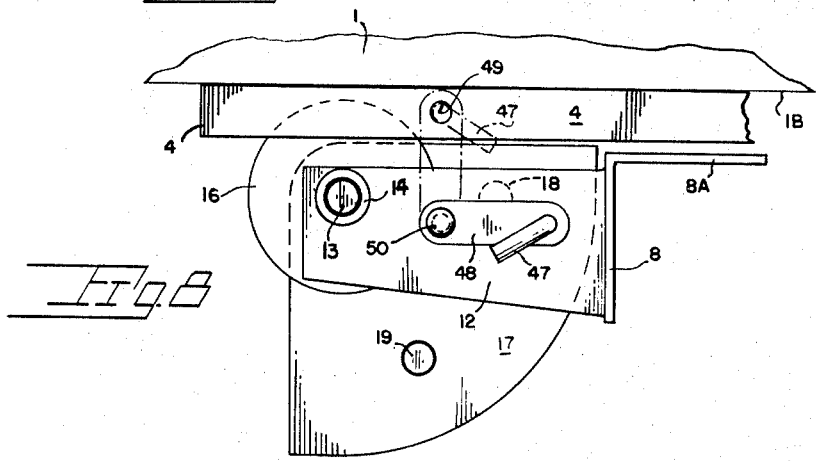

CAMPER LOADING MECHANISM

BACKGROUND OF THE INVENTION

The present invention relates to a mechanism for the loading and unloading of a mobile living unit from the load box of a truck. More particularly such living units are known to the public as campers which are commonly carried in the box of a pickup truck. The present mechanism is carried by the camper unit and readily attachable to the truck body during use.

To the extent known the prior art includes other mechanisms for such camper loading, one such mechanism including gear racks on the camper underside and engageable with a pair of driven gears on the truck for powered loading of the camper into the truck box. Such a mechanism requires extremely precise backing of the truck into place below the raised camper end to assure alignment of the camper as it moves into the truck box.

Other such apparatuses use a cable arrangement for loading of the camper onto the truck with no provision made for accurately moving the camper along the box of the truck. Since reduced clearance exists between the sidewall of the camper and the inner wall of the truck box it is important that the camper be moved parallel to the truck centerline to avoid binding contact with the truck box.

A disadvantage of known mechanisms is the drawback resulting from permanent attachment thereof of components to the truck thus restricting normal truck use. The majority of pickup trucks are used, it is believed, only a minor percentage of the time with campers and hence modifying the truck with a camper loading mechanism reducing the trucks utility is a considerable disadvantage to other such mechanisms.

SUMMARY OF THE INVENTION

The present invention is embodied within a mechanism carried by the camper unit and readily attachable to a pickup truck box during use. Means are provided to facilitate quick and precise attachment of the camper carried components to the truck with no permanent encumbrances mounted on the latter. Sprocket assemblies of the mechanism are in permanently entrained engagement with roller chain segments which are permanently mounted along the forward wall and underside of the camper. Positive engagement of the camper mounted mechanism with the truck prohibits misalignment of the camper as it moves during loading along the truck box. Further the sprocket and chain segments act to lift the camper unit which at all times is prevented from accidental separation.

It is a primary objective of this invention to provide a camper loading mechanism which enables an adult to conveniently load and unload a camper from the box of a pickup truck in one continuous operation and without requiring a degree of mechanical skill on the user's part.

A further important object is the provision of a mechanism carried by the camper and attachable to the truck only during camper use as opposed to being permanently mounted on the truck to encumber the use of the truck for other purposes. Upon removal of the camper structure the truck tailgate may be replaced returning the truck to its standard external configuration.

A further important object is to provide a mechanism which includes concealed locking means retaining the camper in the loaded position and without requiring use of unsightly external turnbuckles and cable hold down devices.

A still further important object is the provision of a mechanism which, during operation, at all times retains the camper in positive retention against sudden tipping movement. The raising, lowering and horizontal movement of a camper is done in a controlled manner.

BRIEF DESCRIPTION OF THE DRAWINGS

In the accompanying drawings:

FIG. 4 is a perspective fragmentary view of one end of the camper carried mechanism with the sprocket carrier shown in a lowered position and removed from the underside of the camper for purposes of illustration only and with a fragment of the truck box, FIG. 5 is a view similar to FIG. 1 with the campers forward portion raised onto the bed of the truck box, FIG. 6 is a view similar to FIGS. 1 and 5 with the camper fully loaded into the truck box, FIG. 7 is a vertical elevational view of the forward wall of the camper taken along line 7—7 of FIG. 6 and showing roller chain and associated channel segments, and FIG. 8 is a side elevational view of the unseen side of the truck attachable framework of FIG. 6 showing camper and channel fragments secured by a locking arm.

DESCRIPTION OF PREFERRED EMBODIMENT

Figure 1:
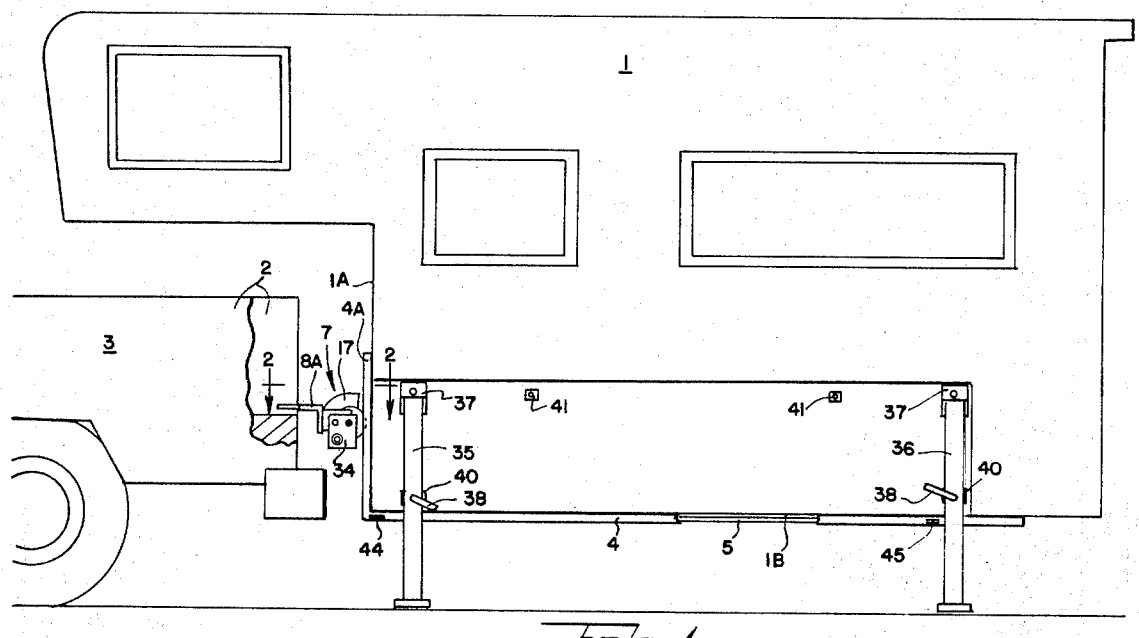
FIG. 1 is a side elevational view of a camper unit with the present mechanism installed thereon just prior to contact with the bed of a pickup truck.

With continuing reference to the drawing wherein applied reference numerals indicate parts similarly identified in the following specification, the reference numeral 1 indicates a camper constituting living quarters for transport within the load carrying box 2 of a pickup truck 3.

The camper shown is typical of such mobile living units used primarily for recreational purposes and carried in a removable manner within the box of a pickup truck. Since most pickup trucks are additionally used for utilitarian purposes it is important that the camper be easily removed from the truck box. As earlier noted other arrangements have been provided for such removal with the components thereof being undesirably secured to the truck.

Figures 2, 3:
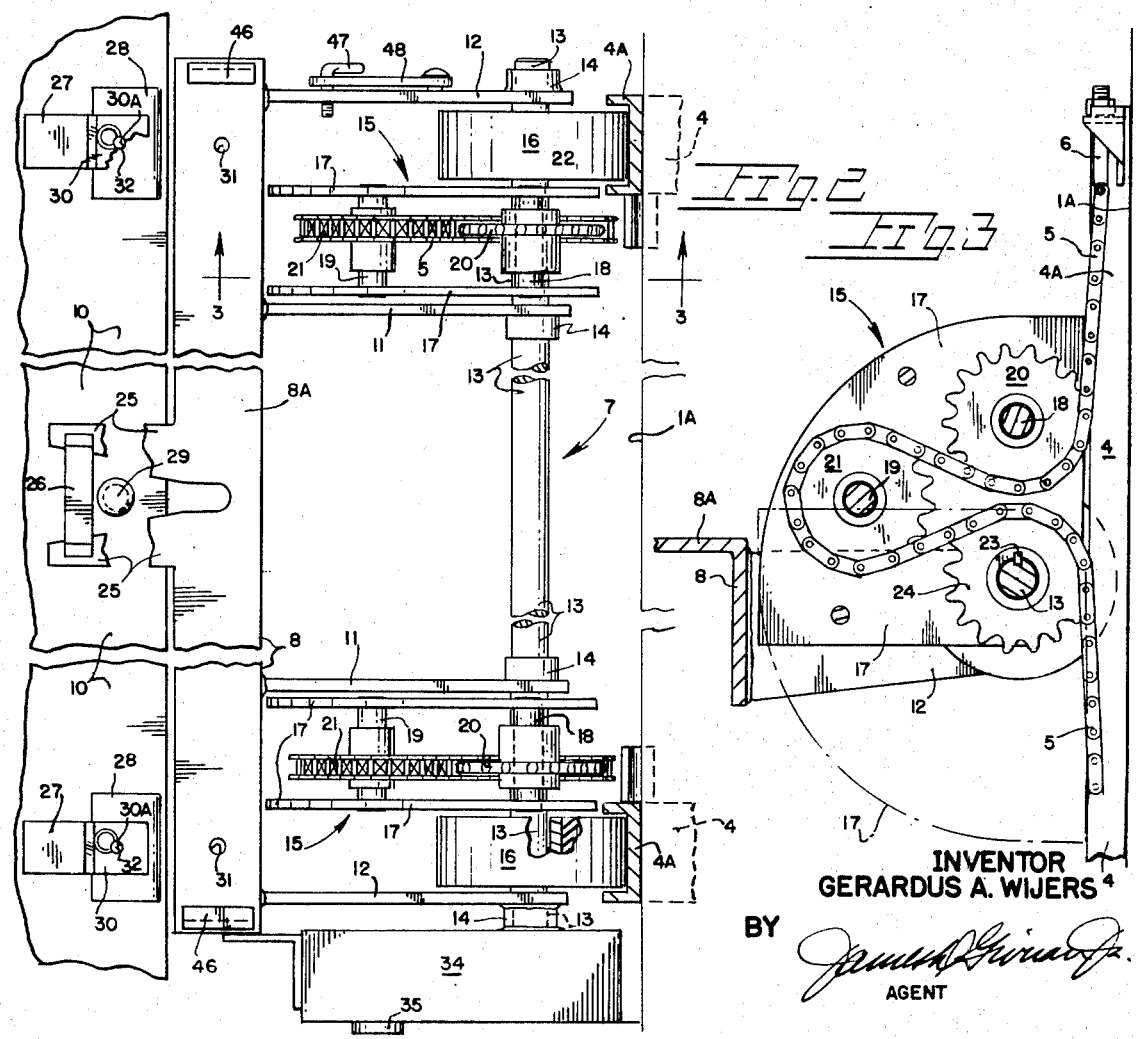
FIG. 2 is a plan view of the truck mounting assembly of the invention taken along line 2—2 of FIG. 1 with sections being removed for convenience of illustration.
FIG. 3 is a vertical sectional view taken along line 3—3 of FIG. 2 and showing details of a sprocket carrier shown in a raised position in full lines with an associated segment of roller chain entrained thereon.

The following described components are all carried by the camper structure and remain therewith upon separation of the camper and the truck. As best seen in FIGS. 1 and 2 a pair of inverted channel members 4 extend along the underside of the camper and have vertical extensions 4A secured to an upright front wall 1A of the camper. Inwardly adjacent each of said channel members 4 and their upright extensions 4A and extending in parallel relationship thereto are roller chain segments 5. Each of the roller chain segments is secured at its uppermost end to a threaded shaft 6 shown in FIG. 3 which permits adjustment of the slack in the chain segments. The roller chain extends parallel to and substantially the length of the channel members 4 and their vertically extending portions 4A.

Supported by the roller chain segments is a truck mounting assembly indicated generally at 7. Extending substantially the width of the truck box is a flanged angle iron member 8 having an upper flange 8A which, when the member is attached to the truck bed, overlies the rear lip portion of the truck bed at 10. Extending rearwardly from the angle iron member, adjacent each of its ends, are pairs of inner and outer mounting brackets 11 and 12 secured as by welding to the vertical flange of angle iron member 8. Each bracket is apertured adjacent its outermost end to receive a shaft 13 with bearings therefor indicated at 14.

Disposed between each pair of inner and outer mounting plates 11 and 12 is a sprocket train assembly indicated generally at 15. A roller 16 is located outwardly of each sprocket train 15 for rolling engagement along each channel member 4. Each roller 16 is rotatably mounted on shaft 13 for rotational movement independent of shaft rotation.

As best seen in FIG. 3, each of the sprocket train assemblies includes a pair of sprocket carriers 17 spaced apart by spindles at 18 and 19 upon which are rotatably mounted idler sprockets at 20 and 21. The sprocket carriers 17 are apertured at 22 to receive the shaft 13 in a manner permitting the carriers and hence the entire sprocket assemblies 15 to be constrained for movement about the major axis of shaft 13.

Keyed to shaft 13 as at 23 is a driving sprocket 24 for each sprocket train assembly for powered rotation by shaft 13 which as aforesaid is journalled. As shown in FIG. 3 a portion of roller chain 5 is at all times engaged with sprockets 20, 21 and an associated driving sprocket 24. Since the sprocket train assemblies 15 are independently swingable about the axis of shaft 13 the assemblies at all times will follow the roller chains 5 to a raised full line position adjacent the front wall 1A of the camper or oppositely to a lowered position adjacent its bottom wall 1B. As seen in FIG. 3 the sprocket assembly 15 shown therein is typical of both assemblies and is in a raised position with the sprocket carriers 17 swung upwardly adjacent the camper front wall 1A. As shown in FIGS. 4 and 5 the sprocket carriers of the sprocket assemblies 15 assume a lowered position when located adjacent the underside 1B of the camper. The sprocket carriers being freely movable about shaft 13 automatically position themselves under the influence exerted by the taut roller chains 5 and the weight of the camper. The roller chain segments 5 are adjustable at 6 to properly tension the chain.

The angle iron member 8 comprises part of the truck mounting assembly and is provided at its center with forwardly diverging fingers 25 as best seen in FIG. 2. Initial contact occurs with a locating pin 29 mounted centrally in the truck bed 10. The inwardly converging fingers 25 function to guide the mounting assembly to a locked position on the rearward edge of the truck bed 10. An arch 26 reinforces the fingers while permitting passage of the pin head therebelow. Attachment of the truck mounting assembly to the truck bed 10 is completed upon the forward edge of flange 8A seating within brackets at 27. Each of the brackets 27 includes a skid plate 28 and an upwardly spaced clip 30 welded thereto with aligned pin openings 30A provided therein. As best shown in FIG. 4 an aperture at 31 in angle iron member 8 is registerable with the pin receiving openings 30A within each of the brackets 27. Accordingly during attaching of the present mechanism with the camper supported upon its legs as seen in FIG. 1, the truck mounting assembly 7 is vertically adjusted into position, with angle iron flange 8A thereof slightly above the truck bed 10. The diverging fingers 25 will function to initially engage the centrally located pin 26 with continued truck movement causing any slight lateral positioning necessary of angle iron member 8. The locking pins at 32 are inserted in openings 30A in brackets 27 upon the flange 8A being seated within the brackets 27.

Affixed by means of a hanger 33 to angle iron member 8 is a gear box 34 within which is housed a reduction gear drive for shaft 13. As seen in FIG. 4 a socket 35 is provided to receive the end of a crank (not shown). Obviously within the discretion of the user an electric drive motor may be mounted in substitution for the manually powered crank. The driving sprockets 24 are keyed to and powered by shaft 13 as earlier mentioned for advancement of the chain segments through the sprocket trains.

The camper is provided with pairs of front and rear legs 35 and 36 each of which is swingably mounted at its upper end within U-shaped brackets 37 to permit upward pivoting of same. Each leg carries a threaded locking pin 38 for threaded engagement with a receptacle typically shown at 40 affixed to the side of the camper. In a retracted position similar receptacles at 41 retain the legs in place.

For holding down the camper loaded in place within the truck box as seen in FIG. 6, a pair of upright locking plates 43 are provided each spaced transversely in the truck bed to closely receive projecting lugs 44 welded to the channels 4 (FIG. 7). Each of the plates 43 is slightly curved for the purpose of centering the channels 4 and of course the camper carried thereby. Accordingly, upon engagement of lugs 44 within the slotted openings in the plates 43 the camper body is held securely against the bed of the pickup truck.

Locking means for the rearward portion of the camper include lugs 45 on each channel 4 which slidingly engage angular locking clips 46 welded to upper flange 8A of angle iron member 8. Locking means are thereby provided for confining the rear end of the camper downwardly against vertical movement relative to the truck bed.

For securing the channels 4 in place in the camper and hence the camper against longitudinal movement I provide a threaded means typically shown in FIG. 8, including a threaded locking member 47 for locking engagement with a threaded aperture 49 formed in the channel section 4. A swingable plate 48 is pivotally mounted at 50 to permit the lock to be moved to an inoperative position wherein the threaded member is engageable with outer bracket member 12 as shown in full lines. It will be appreciated that such last mentioned means functions as a safety measure in that the camper is primarily held against longitudinal movement by the roller chain segments snugly entrained about the sprocket train assemblies 15.

In loading of the camper from its FIG. 1 position, rotary motion is imparted to shaft 13 through the reduction drive in gear box 34. With reference to FIG. 3, showing one of the sprocket train assemblies, sprocket 24 is driven counter-clockwise causing chain segment 5 to be drawn upwardly. Since the chain segments 5 are secured at their ends to the camper body, adjacent the front and rear ends of the channels 4 movement of the chains through the sprocket train assemblies will initially result in lifting and subsequently loading movement of the camper. The length of the chain segments is such as to affect snug entrainment about the sprocket 20 and hence its sprocket train assembly to be located about the axis of shaft 13 and always in close proximity to the camper wall. As shown in FIG. 3 the sprocket train assembly 15 is in the raised position when adjacent the upright front wall 1A of the camper. During lifting of the camper the sprocket train assemblies will retain the raised position of FIG. 3 until the forward edge of the campers bottom wall is lifted to the height of the sprocket train whereat the sprockets 24 and 20, being retained in close proximity to the camper wall by the snug chains 5, will "walk" around the front lower edge of the camper body. The carrier plates 17 and the sprockets 20 and 21 carried thereby will swing downwardly about the axis of shaft 13 to the broken line position of FIG. 3. As shown in FIG. 5 this lowered position of the sprocket train assemblies exists during the forward loading movement of the camper.

The forward pair of legs 35 are retracted and locked in place as soon as the campers forward end is supported by the truck mounting assembly 7. Further lifting of the campers front end ultimately causes forward passage of the front lower edge of the camper past the truck mounting assembly 7. Concurrent therewith is the aforementioned downward swinging of the sprocket trains 15.

With continued powered rotation of the driven sprockets 24 the camper unit will be advanced relative to the truck box 2. At a balance point located along the underside of the camper body forward rotation of the camper unit will occur to lift the rear legs 36 off the ground permitting their retraction and locking in place. Continued cranking of the gear box 34 results in further counter-clockwise rotation of shaft 13 and sprockets 24 to move the camper attached chain segments 5 progressively past the sprockets 20, 21 to eventually pull the camper into the hold down locks earlier described.

Depending on the terrain being level, loading movement may take place in the unbraked truck with same being drawn beneath the camper unit. In such a case, the rear legs 36 as they are inclined during camper loading, retain the camper against forward movement with the truck being pulled rearwardly therebelow. For loading onto a stationary truck the legs 36 may be fitted with rollers.

While I have shown but a single embodiment of the invention, it will be obvious to those skilled in the art that the invention may be embodied otherwise without departing from the spirit and scope of the invention.

What I desire to secure under a Letters Patent is:

1. A mechanism for the loading and unloading of a camper unit from the box of a pick-up type truck, said mechanism comprising, a truck mounting assembly including angular flanged means removably attachable along the rearward edge of the truck bed, pairs of brackets projecting rearwardly from said means, a shaft journalled within said brackets and adapted at one of its ends for engagement with a power source, sprocket train assemblies oppositely disposed on said shaft and each including a driven sprocket secured to said shaft and idler sprockets, sprocket carriers for said idler sprockets swingably mounted on said shaft, said carriers and idler sprockets adapted to move arcuately about their respective driven sprockets during camper loading and unloading operations, and parallel roller chain segments secured at their ends to the camper unit and extending subjacently along the bottom wall surface of the camper and thence upwardly adjacently along the front wall surface of the camper in closely spaced relationship to said surfaces, each of said roller chain segments permanently entrained about the sprockets of a sprocket train assembly with rotation of the driven sprockets of each assembly causing synchronized passage of the chain segments progressively through the sprocket train assemblies thereby imparting loading or unloading movement to the camper with the idler sprockets and their carriers moving arcuately to follow the horizontal and upwardly directed chain segments during loading and unloading operations.

2. A mechanism for the loading and unloading of a camper unit from the box of a pick-up type truck, said mechanism comprising, a truck mounting assembly including angular flanged means removably attachable along the rearward edge of the truck bed, pairs of brackets projecting rearwardly from said means, a shaft journalled within said brackets and adapted at one of its ends for engagement with a power source, sprocket train assemblies oppositely disposed on said shaft and each including a driven sprocket secured to said shaft and idler sprockets, sprocket carriers for said idler sprockets swingably mounted on said shaft, said carriers and idler sprockets adapted to move arcuately about their respective driven sprockets during camper loading and unloading operations, parallel roller chain segments secured at their ends to the camper unit and extending subjacently along the bottom wall surface of the camper and thence upwardly adjacently along the front wall surface of the camper in closely spaced relationship to said surfaces, each of said roller chain segments permanently entrained about the sprockets of a sprocket train assembly with rotation of the driven sprockets of each assembly causing synchronized passage of the chain segments progressively through the sprocket train assemblies thereby imparting loading or unloading movement to the camper with the idler sprockets and their carriers moving arcuately to follow the horizontal and upwardly directed chain segments during loading and unloading operations, and wheel means carried by said truck mounting assembly for sequential rolling engagement with both the bottom and front wall surfaces of the camper during loading and unloading to space same outwardly from the sprocket train assemblies to facilitate operational movement of the camper unit past the present loading mechanism.

3. The mechanism as claimed in claim 2 wherein said wheel means comprise rollers mounted for independent rotation on said shaft, said mechanism additionally including a pair of parallel channel members having horizontal and upright portions affixed respectively to the bottom and front wall surfaces of the camper unit with said channel members adapted for rolling engagement with said rollers with the latter contributing to the guiding of the camper unit onto the truck bed in an aligned manner.

4. The mechanism as claimed in claim 3 wherein each of said chain segments are separately affixed at their ends to a channel member, chain tensioning means coupling one end of said chain segments to their respective channel members, horizontally disposed lugs additionally carried by said channel members, locking means mounted within said truck box and on the flanged means of the truck mounting assembly for locking engagement with said lugs to secure a loaded camper unit against vertical movement when in place within the truck box.

5. The mechanism as claimed in claim 4 additionally including brackets located adjacent the rearward corners of the truck bed with said brackets including spaced apart upper and lower members for reception of one flange of the angular flanged means of the truck mounting assembly preparatory to loading of a camper unit, locking pins insertable through said brackets and said one flange to lock the truck mounting assembly to the truck bed for subsequent loading and unloading of the camper unit.

* * * * *